April 18, 1944.   E. WILDHABER   2,346,806
GEAR CUTTER
Filed June 16, 1939   3 Sheets-Sheet 1

Inventor
Ernest Wildhaber
By B. W. Schlesinger
Attorney

April 18, 1944.   E. WILDHABER   2,346,806
GEAR CUTTER
Filed June 16, 1939   3 Sheets-Sheet 2

Inventor
Ernest Wildhaber
By
Attorney

April 18, 1944. E. WILDHABER 2,346,806
GEAR CUTTER
Filed June 16, 1939 3 Sheets-Sheet 3

Inventor
Ernest Wildhaber
By
B. Schlesinger
Attorney

Patented Apr. 18, 1944

2,346,806

UNITED STATES PATENT OFFICE 2,346,806

GEAR CUTTER

Ernest Wildhaber, Brighton, N. Y., assignor to Gleason Works, Rochester, N. Y., a corporation of New York Application June 16, 1939, Serial No. 279,523

20 Claims. (Cl. 29—105)

The present invention relates to the manufacture of gears and particularly to the production of longitudinally curved tooth gears such as spiral bevel and hypoid gears. The present application is a continuation in part of my copending application, Serial No. 137,531, filed April 17, 1937, now Patent No. 2,285,133, issued June 2, 1942, and relates specifically to the rough-cutting of gears.

One object of the invention is to provide a cutter for rough-cutting gears with which a tooth space of a gear blank may be completely roughcut in a single pass of a gear cutting tool and in a single generating roll.

A further object of the invention is to provide a cutter for cutting tapered gears with which, in a single pass of a cutter and in a single generating roll, a tooth space may be cut that tapers in depth and in width from end to end.

Another object of the invention is to provide cutting apparatus for rough-cutting gears with which a plurality of tooth spaces of a gear blank may be operated upon simultaneously, thus greatly increasing the speed of production and consequently reducing the cost of the rough-cutting operation.

A still further object of the invention is to provide cutting apparatus for rough-cutting gears which will permit employment of two coaxially mounted cutters to operate simultaneously upon two adjacent tooth spaces of a gear blank, whereby an essential simplification in tool mechanism of the gear cutting machine and in the drive thereto may be obtained.

Still another object of the invention is to provide a cutter for rough-cutting longitudinally curved tooth tapered gears with which tooth spaces may be cut that are free of "bias bearing" without the necessity of employing any correcting motion between cutter and work.

Other objects of the invention will appear hereinafter from the specification and from the recital of the appended claims.

Figure 1:
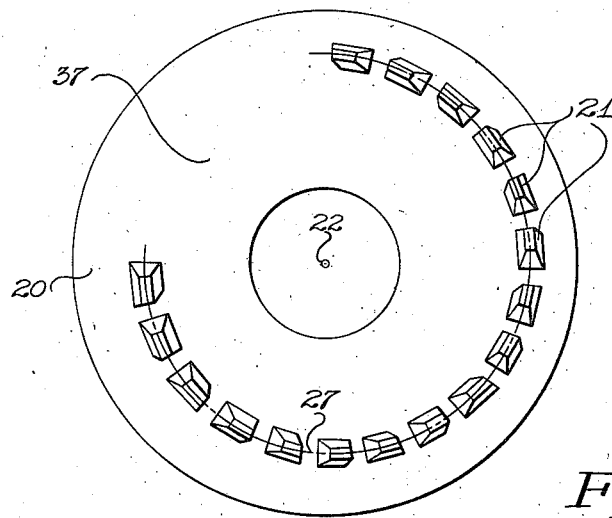
Fig. 1 is a plan view of a roughing cutter constructed according to this invention.

With the present invention, gears are cut in a periodic indexing process and with a generating roll. A scroll-type cutter is employed, that is, a cutter whose cutting blades project beyond one side face of the cutter in the general direction of the axis of the cutter and are arranged in a spiral at different radial distances from the axis of the cutter. The spiral in which the blades of the cutter are arranged has, however, a lead less than the smallest normal pitch of the gear to be cut and the blank is indexed periodically to cut successive tooth spaces.

For the purpose of producing tooth spaces that taper in depth or in width, or both, from end to end, as is required on spiral bevel and hypoid gears, the blades of the cutter are made of progressively varying operating contour. They may vary progressively in width, or in height, or in both respects. The blades are adapted to cut at progressively different points along the length of a tooth space during the generating roll. One blade will cut at the large end of the tooth space, another blade will cut at the small end of the tooth space, and between these blades there will be blades to cut at all intermediate points along the length of the tooth space.

The different blades may be arranged either in a plane spiral or in a three-dimensional spiral. That is, the blades may be so made that their opposite sides intersect in points which lie in a plane perpendicular to the axis of the cutter or in points which are displaced from one another axially of the cutter. When a cutter of the latter type is employed it is possible to rough-cut spiral bevel and hypoid gears without "bias bearing," but nevertheless without requiring any correcting motion.

The roughing operation, as already indicated, is effected during relative generating roll of the cutter and blank. By timing the rotation of the cutter to the generating roll, the different blades of the cutter will operate at different points in the roll and thus cut a tooth space in the gear blank of the desired taper in depth and width. As the cutter rotates in engagement with the blank, the blade, which is adapted to cut at the large end of the tooth space, will clear the small end of the tooth space and vice versa, because of the longitudinal inclination of the teeth of spiral bevel and hypoid gears and because of the generating roll employed.

Preferably the cutter will be made of such diameter and provided with a sufficient number of blades to rough-cut a tooth space of a gear blank completely in a single revolution. Accordingly, a gap is preferably provided between the last and first blades of the cutter that is of sufficient angular extent to permit of indexing the blank, without relative withdrawal of the cutter from the blank, when the gap is abreast of the blank. Where such a cutter is employed, the cutter may be adjusted initially into engagement with the blank so that its blades will cut to the full depth of the tooth spaces of the blank without relative depthwise feed between cutter and blank. In the roughing operation, then, the cutter and blank are rotated in engagement while a relative rolling movement is produced between the cutter and blank in time with the cutter rotation and, on each revolution of the cutter, when the gap in the cutter is abreast of the blank, the blank will be indexed. A tooth space of the blank will thus be rough-generated on each revolution of the cutter.

The scroll form of cutter is preferably not used alone but in combination with another scroll cutter or in combination with a standard face-mill gear cutter. Thereby, cutting may be effected simultaneously in a plurality of tooth spaces of the gear blank.

Where a scroll cutter is employed in combination with other scroll cutters, the several cutters will differ in lead so as to permit of rough-cutting simultaneously a plurality of tooth spaces with the proper taper in width. Moreover, the different cutters will be made with blades of different heights so that the different cutters will cut successively deeper into a tooth space of the blank, when the blank is indexed. Thus, the work of roughing out the tooth slots of the blank will be distributed equally among the several cutters.

Where a scroll cutter made according to this invention is employed in combination with a standard face-mill gear cutter, the standard cutter may be either the outside cutter or the inside cutter, depending upon the direction of indexing rotation of the work. It is desirable to have the standard cutter arranged so it can take the initial cut in the blank and to employ the scroll cutter simply to deepen the slot previously cut out by the standard cutter and to apply the final roughing cut. The standard cutter may be driven at a different rate of speed from the scroll cutter. The scroll cutter makes preferably only one revolution in the cutting of a tooth space of the blank and the indexing of the blank may be effected by extending the roll so that the blank will roll clear of the cutters, or by effecting a slight relative withdrawal movement between the cutters and the blank, when the scroll cutter is abreast of the blank, and then indexing the blank.

To cut tooth spaces of tapering width from end to end it has heretofore been proposed to use two eccentrically mounted face-mill gear cutters. Either of the last two described embodiments of the invention has the advantage over two eccentrically mounted face-mill cutters that the two cutters may be mounted coaxially. This simplifies the construction of the gear cutting machine and especially of the cutter drive.

The cutters employed in the present invention may have either straight side-cutting edges or cutting edges of curved profile and, if a profile curvature is used, this may be of any suitable character.

Reference will now be had to the drawings for a more detailed description of the invention.

Figure 2:
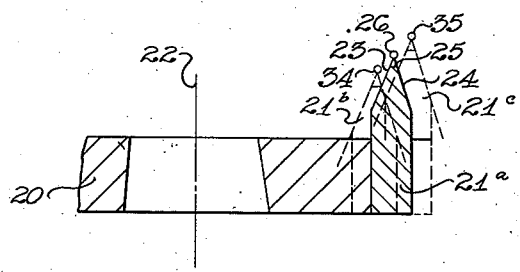
Fig. 2 is a fragmentary sectional view and Fig. 4 is a developed view further illustrating one specific embodiment of such a cutter.

In Figs. 1 and 2, a cutter 20 is shown that has a plurality of cutting blades 21. These blades project beyond one side face of the cutter in the general direction of the axis 22 of the cutter and are arranged in a spiral about the axis 22 of the cutter. The opposite side-cutting edges of the blades are preferably made straight and of positive pressure angle, as indicated by the blade 21a shown in section in Fig. 2. The opposite sides of this blade are denoted at 23 and 24, respectively, and its tip cutting edge is denoted at 25. When prolonged, the opposite sides of the blade intersect in a point, such as the point 26 and form an inverted V.

To cut, as desired, the tooth spaces of a tapered gear, successive blades of the cutter are made of varying width or height or both so that as they cut successively along the length of a tooth space of a gear blank, they will produce the desired variation in width or depth or both of the tooth space.

Since the blades 21 of the cutter 20 are arranged in a spiral, the points of convergence of the opposite sides of these blades lie also in a spiral, as indicated at 27 in Fig. 1. The spiral 27 may be a plane spiral located in a plane perpendicular to the axis 22 of the cutter or it may be a spiral in space. The two different embodiments of the invention are illustrated diagrammatically in Figs. 3 and 4.

Figure 3:
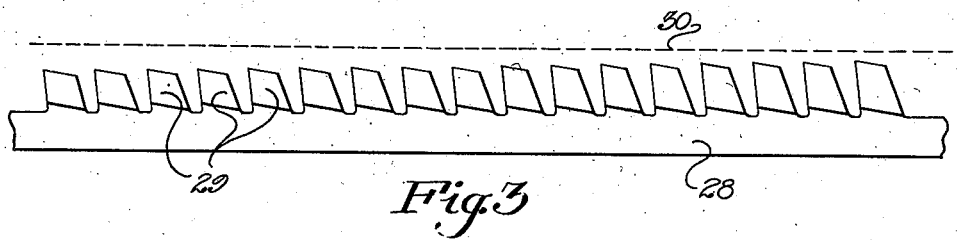
Fig. 3 is a developed view illustrating another specific embodiment of such a cutter.

Fig. 3 shows the development of a scroll cutter 28 having a plurality of cutting blades 29 which are of progressively increasing height. The opposite side-cutting edges of the blades of this cutter converge in points which lie in a plane spiral which, in the developed view, is denoted by the straight line 30.

Figure 4:
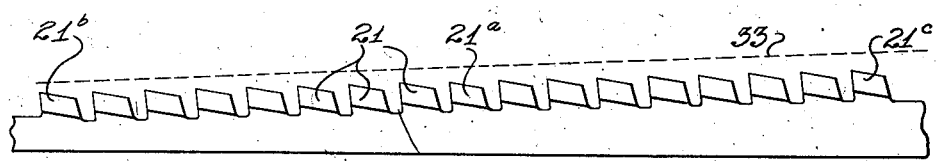

Fig. 4 shows a scroll type cutter having a plurality of cutting blades 21 which are also of progressively varying height but whose opposite side-cutting edges converge in points that lie in a spiral in space, that is, in a spiral which is displaced axially as well as radially of the cutter axis. This spiral is indicated by the dotted line 33 in the developed view of Fig. 4.

The arrangement shown in Fig. 4 is further illustrated in Fig. 2. This figure shows one blade 21a of the cutter in section and two other blades 21b and 21c in dotted lines. The blade 21b may cut at the large end of a tooth space of a gear blank, the blade 21a midway the length of the tooth space, and the blade 21c at the small end of the tooth space. The opposite sides of these blades converge in the points 34, 26 and 35, respectively. These points have not only different radial distances from the axis 22 of the cutter but also different positions axially of the cutter.

A cutter such as shown in Figs. 2 and 4 has the advantage that it will rough-cut gears free of "bias-bearing." In my United States Patent No. 1,980,365 I have disclosed a method for simultaneously cutting two sides of the teeth of a spiral bevel or hypoid gear without "bias bearing." This method consists in providing an axial motion, during the generating roll, about the axis of the crown gear or other basic gear to which the gear being cut is generated conjugate. The cutter illustrated in Figs. 2 and 4 makes it possible to eliminate this additional motion and still avoid a "bias bearing," for, when such a cutter is turned on its axis, it is as though a scroll cutter were being turned on its axis and simultaneously moved along that axis.

The scroll cutter of the present invention differs from prior forms of scroll cutters in that instead of the cutting blades being arranged in a spiral whose lead is equal to or a multiple of the pitch of the gear to be cut, the cutting blades are arranged in a spiral whose lead is less than the pitch of the gear to be cut. With prior types of scroll cutters, the cutter and blank were rotated continuously together in timed relation and the rotation of the blank itself effected the indexing of the blank. With the cutter of the present invention, the blank does not have a continuous indexing rotation but is indexed intermittently. The cutter may be withdrawn from engagement with the blank to permit of indexing the blank but preferably a gap, such as shown at 37 in Fig. 1, is provided between the last and first blades of the cutter which is of sufficient angular extent to permit of indexing the blank when the gap in the cutter is abreast of the blank.

In operation, the cutter is rotated in engagement with the blank while a relative rolling movement is produced between the cutter and blank in time with the cutter rotation. During this rolling movement, therefore, the different blades of the cutter cut at progressively different points along the length of a tooth space of the blank, producing the desired taper of the tooth space. When the gap 37 in the cutter is abreast of the blank, the rolling movement is reversed and the blank indexed. At the end of the return roll, the roll is again reversed and the cutter begins to rough-generate a new tooth space of the blank.

Preferably, the scroll-type cutter, such as shown in Figs. 1 to 4, inclusive, is not used alone but in combination with other scroll-type cutters or in combination with standard face-mill gear cutters.

Figure 5:
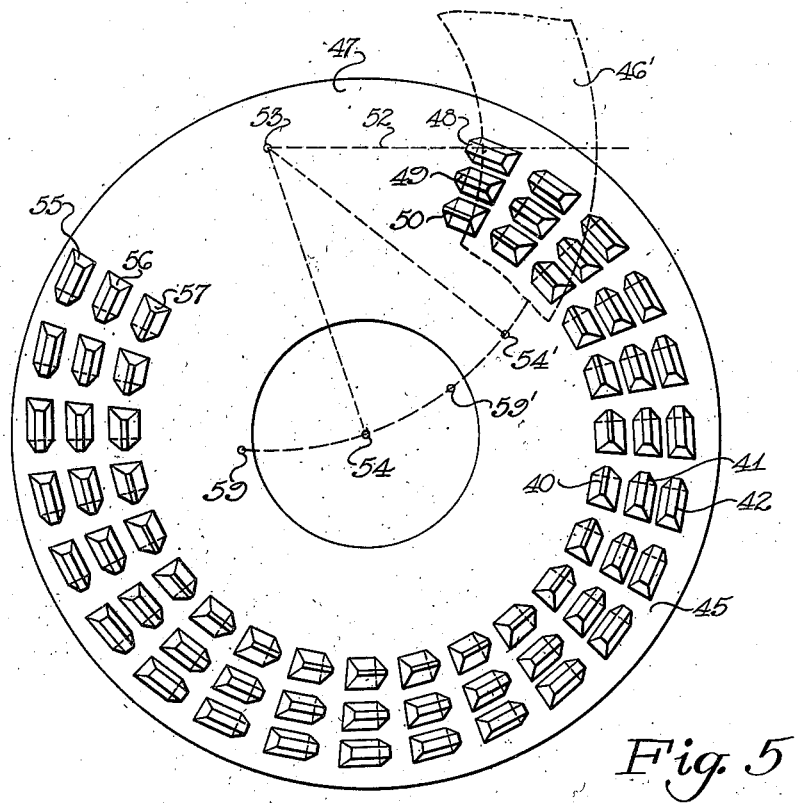
Fig. 5 is a plan view showing a roughing cutter constructed according to another embodiment of this invention and illustrating the relationship of the blank and cutter during the rough-cutting operation.
Figure 6:
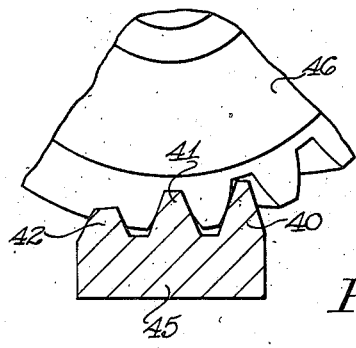
Fig. 6 is a fragmentary sectional view of a gear blank and the cutter shown in Fig. 5, further illustrating their cutting relationship.

Figs. 5 and 6 show a scroll cutter used in combination with other scroll cutters. Here three cutters are shown used in combination as indicated by the three rows 40, 41 and 42 of cutting teeth. In the embodiment shown, the three rows of blades are made integral with a common head 45 so that in effect they constitute a single cutter having a plurality of cutting blades arranged part-way around its periphery in two spirals denoted at 42 and 41 and in a circle or spiral 40, respectively. The three rows of blades are adapted to cut, respectively, in different tooth spaces of a gear blank as shown in Fig. 6.

While the heights of the successive teeth of each row of blades vary around each row, the corresponding cutting teeth of the different rows of blades are also preferably made different in height from one another, as shown in Fig. 6. The gear blank 46, which is to be cut, is indexed in such direction that the row of blades 42, which are of the smallest height, cut into the solid blank. The second row of blades 41 cuts further into a tooth space which has previously been roughed out by the row 42, and the inmost row of blades 40 applies the final roughing cut in a tooth space through which the two other rows of blades 42 and 41 have previously passed. This means that, as viewed in Fig. 6, the blank is indexed in a counterclockwise direction. Preferably, the blades in the inmost row 40 are arranged so that the points of convergence of their opposite sides will lie in a circle or a helix circumscribed about the axis of the cutter.

In cutting a gear with the cutter 45, the cutter is rotated in engagement with the gear blank while the relative rolling movement in time with the cutter rotation is produced between the cutter and blank, and the blank is indexed through one tooth space when the gap 47 of the cutter is abreast of the blank. The first cutting blades 48, 49 and 50 of the cutter are adapted to cut at the large end of the tooth spaces of the blank. By varying the pressure angle of these blades in the several rows, it is possible to have the roughing rows 42 and 41 cut the desired spiral angle and pressure angle upon the gear. Thus, as shown in Fig. 6, the blades of the row 42 are provided with sides of larger pressure angle than the sides of the blades of the row 41 and, in turn, the blades of row 41 are provided with blades whose pressure angles are greater than the pressure angles of the sides of the blades 40.

It is believed unnecessary to show the computation of the shape of the threads 41 and 42 in detail because this can be determined experimentally without difficulty. A pinion, like the one to be cut, may be gashed and used as a cutting tool for forming the required thread shape in a lead blank. This is done by rotating the lead blank in engagement with the pinion tool while producing a relative rolling movement between the lead blank and the pinion tool exactly the same as if the cutter represented by the lead blank were rotating and rolling with the pinion to be cut. This experimental determination of the cutter shape is also applicable to other embodiments of the invention.

In Fig. 5, the pinion to be cut is shown in development and denoted at 46'. Its axis is at 52 and its apex at 53. The cutter 45 is shown at the start of the roll. During the roll, the cutter is swung relative to the blank about the apex or axis 53 of the basic generating gear so that the cutter axis moves from the position 54 to the position 54'. In the position 54', cutting blade 57 will have just finished cutting the small end of a tooth space of the gear blank. Then follows a quick return roll to position 54 and indexing of the blank through one tooth space, while the gap 47 of the cutter is abreast of the blank.

Since all three rows of blades cut into the solid blank on the first generating roll, it is desirable to remove a reduced amount of stock during this roll, thereby to reduce the burden upon the tool. For this reason, it is desirable to make the first roll a special roll. For this purpose, the cutter may be rolled from the position 59 to the position 59' during the first roll. This leaves an extra amount of stock in the first three tooth spaces of the gear blank which have to be removed. For this reason, the blank should be indexed one more time than it has tooth spaces in order to permit recutting the first tooth space to the desired depth. The total number of rolls therefore will equal the number of tooth spaces in the blank plus one. In other words, the blank is completely roughed out after the cutter has made $n+1$ revolutions, where $n$ is the number of tooth spaces in the blank.

The wide points of the cutting teeth of the cutter shown in Figs. 5 and 6 make for longer cutter life. Even the point width of the blades of the row 40 which performs the final cut and forms the whole tooth side is generally wider than the point width used in prior cutting methods except for those blades which cut at the small end of the tooth space of the blank, and those blades are equal in point width to the point width of the blades of cutters of previous construction.

Figure 7:
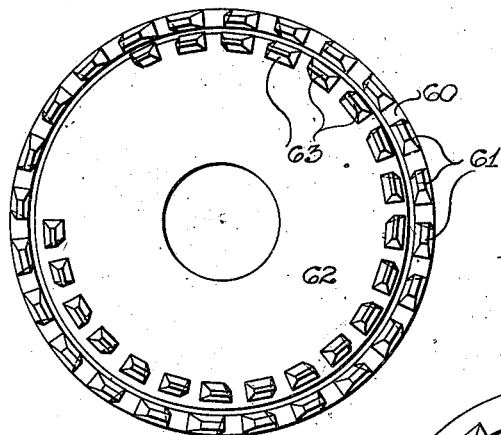
Fig. 7 is a plan view and Fig. 8 a transverse section showing how a scroll-type cutter made according to this invention may be combined with a standard face-mill gear cutter for the purpose of rough-cutting gears according to this invention.
Figure 9:
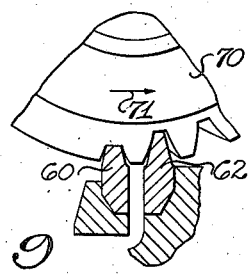
Fig. 9 is a fragmentary view illustrating the method of operation of the cutters shown in Figs. 7 and 8.
Figure 8:
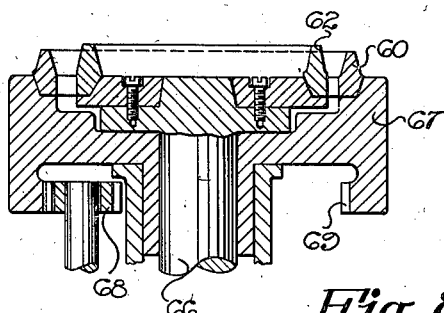

A further embodiment of the invention is illustrated in Figs. 7 to 9 inclusive. Here a cutter of spiral form constructed according to the present invention is combined with an ordinary face-mill gear cutter for the purpose of the rough-cutting. The standard face-mill gear cutter is denoted at 60. It has a plurality of cutting blades 61 arranged annularly around its periphery and projecting beyond one side face in the general direction of its axis. The spiral cutter is denoted at 62. It has a plurality of cutting blades 63 arranged in a spiral about its axis. The blades of the standard cutter 60 are of uniform height according to standard practice. The blades of the cutter 62 vary in height or in width or both.

The two cutters 60 and 62 are mounted coaxially of one another but are preferably driven independently of one another. The cutter 62 may be secured to a spindle 66 and the cutter 60 to a plate 67 which is journaled coaxially of the spindle 66. The plate 67 may be driven through a pinion 68 and an internal gear 69, while the spindle 66 may be driven from any other suitable source of power.

The blades 61 of the cutter 60 are preferably made of reduced height and consequently of wide point width. The blank 70 (Fig. 9) to be cut is indexed in the direction indicated by the arrow 71 so that the cut into the solid is made, except in the first roll, exclusively by the cutting blades or teeth of the standard cutter 60. The scroll cutter 62 produces the desired final tooth depth and tooth taper.

The standard cutter 60 is rotated at a convenient cutting speed. It may turn three or four times per revolution of the scroll cutter 62. The scroll cutter makes only one revolution per cycle or per complete generating roll. Preferably, the roll is started in the position where the standard cutter 60 clears the blank entirely and the indexing of the blank takes place in the same position.

Figure 10:
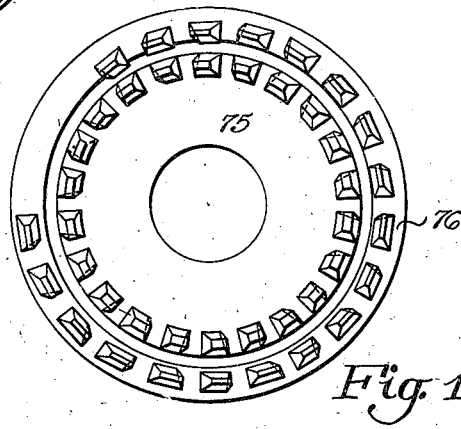
Fig. 10 is a plan view showing a different combination of face-mill and scroll cutters.

Fig. 10 illustrates a modification of the embodiment shown in Figs. 7 to 9, inclusive. Here the standard face-mill cutter, which is denoted at 75, is mounted inside of the scroll cutter which is denoted at 76. Otherwise, the basic construction of the two cutters is the same as described with reference to the embodiment shown in Figs. 7 to 9, inclusive. The standard cutter has blades of uniform height while the scroll cutter has blades of progressively varying operating contour.

While the invention has been described in connection with embodiments in which the tools have straight side-cutting edges, it will be understood that the invention is applicable also to tools with curved side-cutting edges. Several such embodiments are possible. Thus the blades of a cutter may have outside and inside cutting edges which are both concave, or the outside cutting edge may be of straight profile and the inside cutting edge of concave shape, or the outside cutting edge may be convex and the inside cutting edge concave, etc., as described in more detail in my parent application above mentioned.

The blades of the cutters made according to the present invention may be sharpened so that each blade has opposite side-cutting edges, or alternate blades may be sharpened to have oppositely disposed side-cutting edges, or any other suitable method of sharpening may be employed. If alternate blades have oppositely disposed cutting edges, the inverted V in which the opposite side-cutting edges lie, is understood to be the V formed by the axial profile of the surfaces in which the outside and inside cutting edges lie, that is to say, the axial profile of the cutting surfaces.

While the invention has been described in connection with a number of different embodiments thereof, it will be understood that it is capable of still further modification. This application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus descried my invention, what I claim is:

1. A tool for generating longitudinally curved tooth tapered gears in an intermittent indexing operation comprising a rotary head and a plurality of cutting blades which project beyond one side face of the head in the general direction of the axis of the head, said blades being of progressively varying width in a plane perpendicular to the axis of the cutter and being of progressively varying height and progressively varying point width and being arranged at progressively varying radial distances from the axis of the head and having their opposite side-cutting edges converging in points which lie in a spiral curve of varying axial position whose lead is less than the pitch of the gear to be cut.

2. Cutting apparatus for generating longitudinally curved tooth gears in an intermittent indexing operation comprising a pair of coaxially mounted cutting members which are adapted to operate, respectively, in different tooth spaces of a gear blank, both of which have cutting blades projecting beyond one side face and one of which has its blades circularly arranged and the other of which has its blades of progressively varying height and arranged at varying distances from the axis of the cutter.

3. Rotary cutting apparatus for generating longitudinally curved tooth gears in an intermittent indexing operation having cutting blades arranged in a plurality of rows about its axis and projecting beyond one side face, the different rows of blades being adapted to cut simultaneously in different tooth spaces of the work, respectively, the blades in one of the rows, at least, being of progressively varying height and being arranged in a spiral whose lead is less than the pitch of the gear to be cut, said spiral being non-parallel to the curves in which the blades of the other rows are arranged.

4. A rotary gear cutter for generating tapered gears in an intermittent indexing operation, said cutter having two or more rows of cutting teeth which project beyond one side face of the cutter in the general direction of its axis and are adapted to cut in different tooth spaces of a gear blank, respectively, the teeth of each row being of progressively varying height and the teeth of one row being of greater height than the teeth of the next adjacent row, the teeth of one row being arranged in a curve which diverges from the curves in which the teeth of the other row or rows are arranged and the teeth of one row, at least, being arranged part-way only around the cutter axis.

5. Cutting apparatus for generating longitudinally curved tooth gears in an intermittent indexing operation comprising two coaxially mounted cutters, which are adapted to cut simultaneously in two different tooth spaces of the work, respectively, one of which has a plurality of cutting blades projecting from one side face in the general direction of its axis and disposed at a constant radial distance from its axis and the other of which has a plurality of cutting blades of progressively varying height projecting from one side face in the general direction of its axis and disposed at varying radial distances from its axis and arranged in a spiral whose lead is less than the pitch of the gear to be cut.

6. Cutting apparatus for generating longitudinally curved tooth gears in an intermittent indexing operation comprising two coaxially mounted cutters, which are adapted to cut simultaneously in two different tooth spaces of the work, respectively, one of which has a plurality of cutting blades projecting from one side face in the general direction of its axis and disposed at a constant radial distance from its axis and the other of which has a plurality of cutting blades of progressively varying height and width projecting from one side face in the general direction of its axis and disposed at varying radial distances from its axis and arranged in a spiral whose lead is less than the pitch of the gear to be cut, and one of which has cutting blades arranged part-way only around its periphery.

7. Cutting apparatus for generating longitudinally curved tooth gears in an intermittent indexing operation comprising two cutters that are mounted one within the other for rotation about a common axis and that are adapted to operate simultaneously in two adjacent tooth spaces of a gear blank, each of which has a plurality of cutting blades projecting beyond one side face in the general direction of its axis, the cutting blades of the two cutters being arranged in two relatively diverging curves and the cutting blades of one cutter being shorter than the cutting blades of the other cutter.

8. Cutting apparatus for generating gears in an intermittent indexing process comprising a plurality of side-cutting blades which are arranged in a plurality of groups which are located one within another for rotation about a common axis and which are adapted to operate simultaneously in adjacent tooth spaces of a gear blank and whose cutting portions extend in the general direction of said axis, the blades of one group being arranged in a spiral whose lead is less than the pitch of the gear to be cut and the blades of another group being arranged concentric of said common axis, the blades of the different groups being of different height, the blades of the concentric group being of the least height.

9. Cutting apparatus for generating gears in an intermittent indexing process comprising a plurality of side-cutting blades which are arranged in a plurality of groups that are located one within another for rotation about a common axis and that are adapted to operate simultaneously in adjacent tooth spaces of a gear blank and whose cutting portions extend in the general direction of said common axis, successive blades of each group being of progressively varying height and the blades of the several groups being arranged along curves which diverge from one another, the blades in one of said groups being arranged in a spiral whose lead is less than the pitch of the gear to be cut.

10. Cutting apparatus for generating gears in an intermittent indexing process comprising a plurality of side-cutting blades which are arranged in a plurality of groups that are located one within another for rotation about a common axis and that are adapted to operate simultaneously in adjacent tooth spaces of a gear blank and whose cutting portions extend in the general direction of said axis, successive blades of each group being of progressively varying height and having their corresponding side-cutting edges inclined at the same angle to said common axis, the blades of the several groups being arranged in relatively diverging curves, the blades in one of said groups being arranged in a spiral whose lead is less than the pitch of the gear to be cut.

11. Cutting apparatus for generating gears in an intermittent indexing process comprising a plurality of side-cutting blades which are arranged in a plurality of groups that are located one within another for rotation about a common axis and that are adapted to operate simultaneously in adjacent tooth spaces of a gear blank and whose cutting portions extend in the general direction of said common axis, the blades of a plurality of said groups being arranged in a plurality of different spirals, respectively, the leads of the several groups differing from one another and the lead of the spiral of each group being less than the pitch of the gear to be cut.

12. Gear-cutting apparatus for generating gears in an intermittent indexing process comprising a plurality of side-cutting blades which are arranged in a plurality of groups that are located one within another for rotation about a common axis and that are adapted to operate simultaneously in adjacent tooth spaces of a gear blank and whose cutting portions extent in the general direction of said axis, the blades of a plurality of groups being arranged in a plurality of spirals whose leads differ and are less than the pitch of the gear to be cut, corresponding side-cutting edges of successive blades of each group having the same inclination to said common axis, but corresponding side-cutting edges of the blades of different groups having different inclinations to the axis of the cutter.

13. Gear-cutting apparatus for generating gears in an intermittent indexing process comprising a plurality of side-cutting blades which are arranged in a plurality of groups that are located one within another for rotation about a common axis and are adapted to operate simultaneously in adjacent tooth spaces of a gear blank and whose cutting portions extend in the general direction of said common axis, the blades of a plurality of said groups being arranged in a plurality of spirals whose leads differ and are less than the pitch of the gear to be cut, the blades of one group being of less height than the blades of the next adjacent group.

14. Gear-cutting apparatus for generating gears in an intermittent indexing process comprising two cutters mounted one within the other for rotation about a common axis, each of which has a plurality of side-cutting blades projecting beyond one side face in the general direction of said common axis, the blades of one cutter being arranged concentric of said axis and the blades of the other cutter being arranged in a spiral about said axis, the blades of one cutter being shorter than the blades of the other cutter, and means for driving the two cutters at different speeds.

15. Gear cutting apparatus for generating gears in an intermittent indexing process comprising a plurality of coaxially arranged rows of cutting blades which extend in the general direction of their common axis, all the blades of a row having corresponding side cutting edges of the same pressure angle but different rows having corresponding side cutting edges of different pressure angle, the different rows of blades being of different height and the row of blades which is of greatest pressure angle being of smallest height.

16. Gear cutting apparatus for generating gears in an intermittent indexing process comprising a plurality of coaxially arranged rows of cutting blades which extend in the general direction of their common axis, all the blades of a row having corresponding side cutting edges of the same pressure angle but the different rows of blades having side cutting edges of different pressure angle, the different rows of blades being of different height, the row of blades which is of greatest pressure angle being of smallest height and the blades of one row being arranged in a spiral about said common axis.

17. Cutting apparatus for generating longitudinally curved tooth gears in an intermittent indexing operation comprising a pair of coaxially mounted cutting members which are adapted to operate, respectively, in different tooth spaces of a gear blank, both of which have cutting blades projecting beyond one side face and one of which has its blades circularly arranged and the other of which has its blades of progressively varying height and of progressively varying width in a plane perpendicular to the axis of the cutter and arranged at varying distances from the axis of the cutter.

18. Rotary cutting apparatus for generating longitudinally curved tooth gears in an intermittent indexing operation having cutting blades arranged in a plurality of rows about its axis and projecting beyond one side face, the different rows of blades being relatively diverging the blades in one of the rows, at least, being of progressively varying height and of progressively varying width in a plane perpendicular to the axis of the cutter and being arranged in a spiral whose lead is less than the pitch of the gear to be cut.

19. Cutting apparatus for generating gears in an intermittent indexing process comprising a plurality of side cutting blades which are arranged in a plurality of groups that are located one within another for rotation about a common axis and that are adapted to operate simultaneously in adjacent tooth spaces of a gear blank and whose cutting portions extend in the general direction of said common axis, successive blades of each group being of progressively varying height and width, corresponding side cutting edges of the blades of each group being of the same profile shape and pressure angle, and the blades in one of said groups being arranged in a spiral whose lead is less than the pitch of the gear to be cut, the blades of the other groups being arranged in curves that are non-parallel to said spiral and to one another.

20. Cutting apparatus for generating longitudinally curved tooth gears in an intermittent indexing process comprising two coaxially arranged cutters, each of which has a plurality of cutting blades projecting beyond one side face in the general direction of its axis, the cutting blades of one cutter being arranged in a curve which diverges from the curve in which the cutting blades of the other cutter are arranged, and the cutting blades of one cutter being shorter and of greater pressure angle than the corresponding cutting blades of the other cutter, and the blades of one cutter, at least, being of progressively varying width in a plane perpendicular to the cutter axis.

ERNEST WILDHABER.